March 24, 1959 K. S. DEEDS 2,878,558
APPLICATOR FOR DRILL PIPE PROTECTOR RINGS
Filed May 13, 1954 3 Sheets-Sheet 1
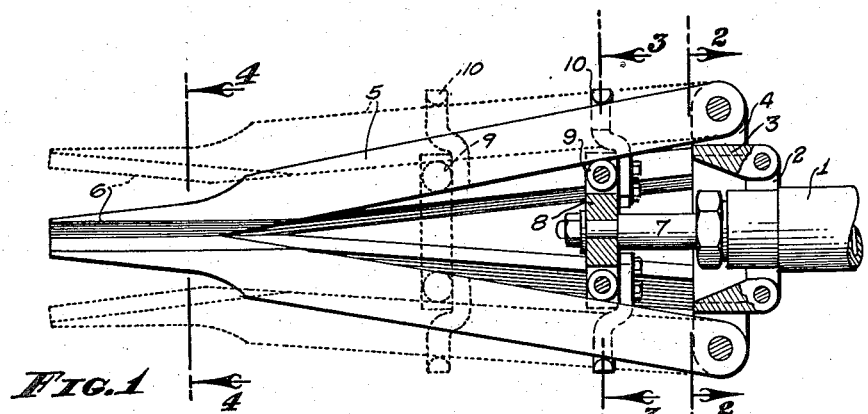
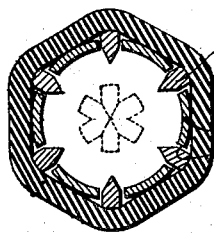
Fig.4
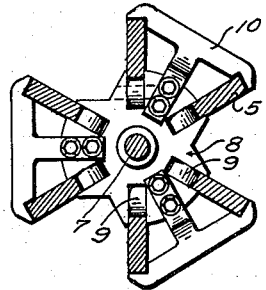
Fig.3
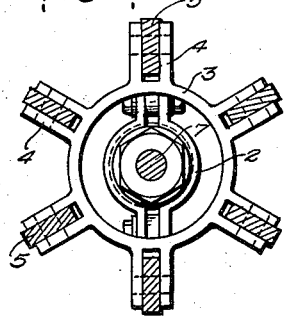
Fig.2
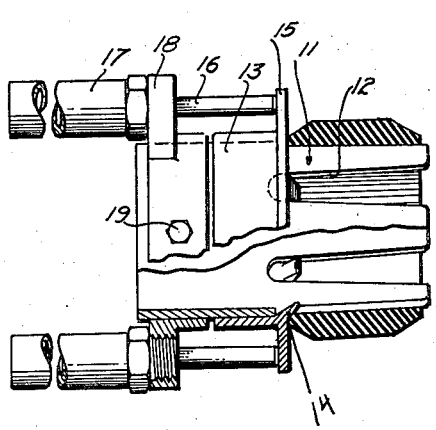
Fig.6
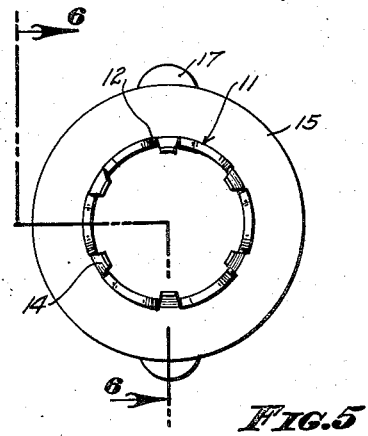
Fig.5
INVENTOR.
KARL S. DEEDS
BY
ATTORNEYS

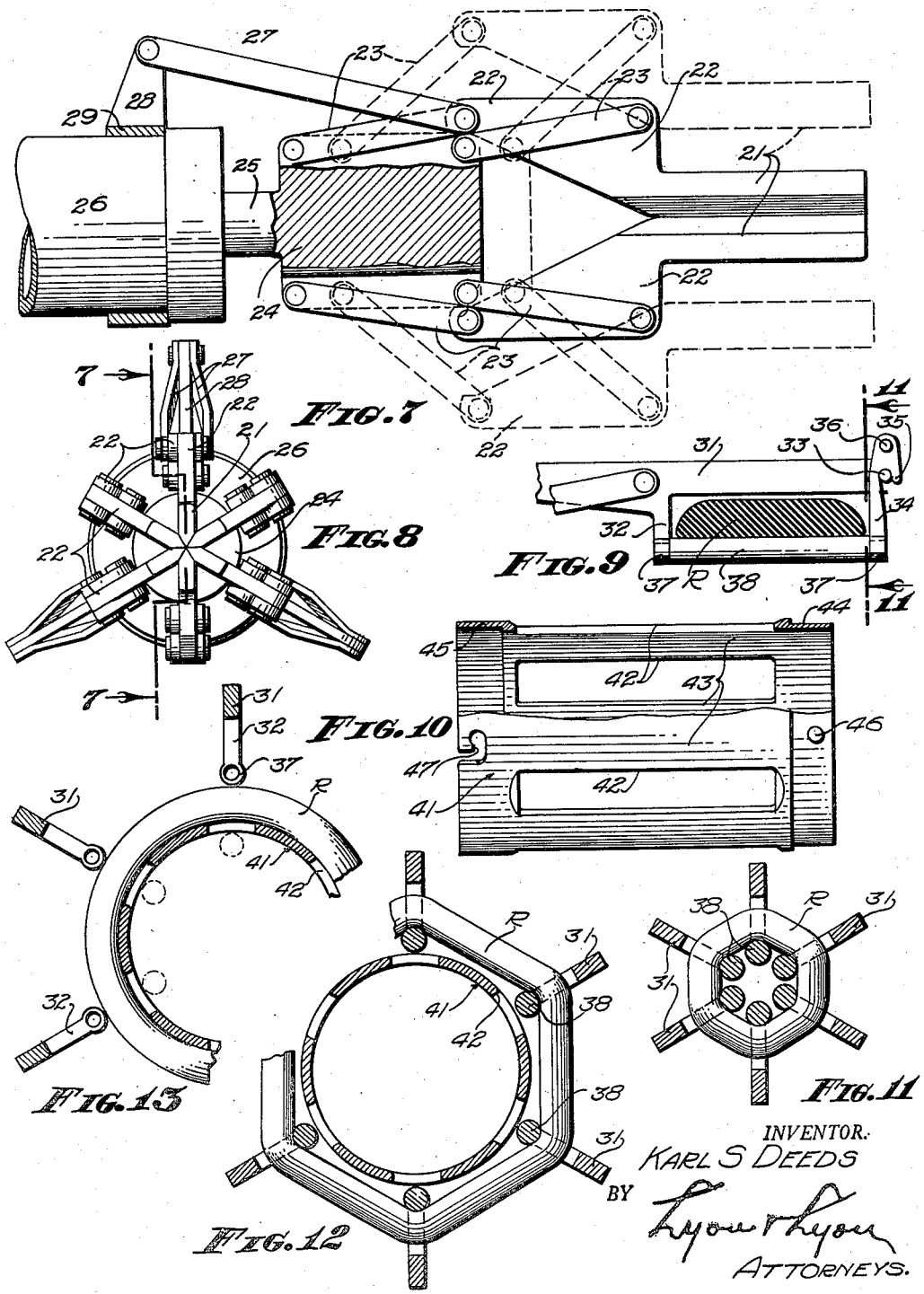

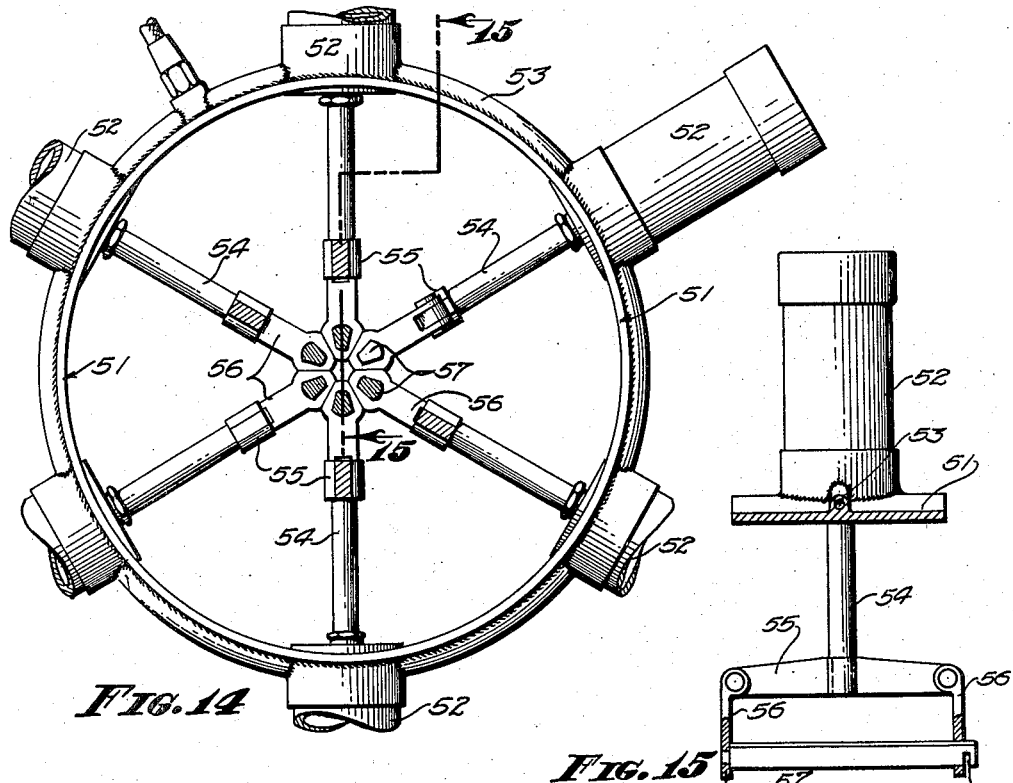
FIG. 14
FIG. 15
FIG. 16
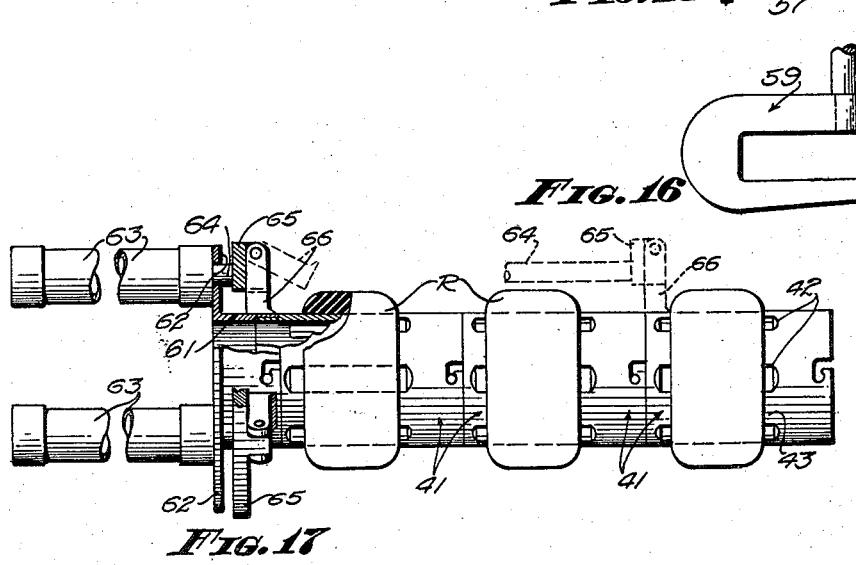
FIG. 17
INVENTOR.
KARL S. DEEDS
BY
ATTORNEYS United States Patent Office 2,878,558
Patented Mar. 24, 1959

2,878,558

APPLICATOR FOR DRILL PIPE PROTECTOR RINGS

Karl S. Deeds, Long Beach, Calif.

Application May 13, 1954, Serial No. 429,606

23 Claims. (Cl. 29—236)

My invention relates to an applicator for drill pipe protector rings and is a continuation-in-part of my previously filed application for Applicator for Drill Protector, filed October 24, 1950, Serial No. 191,852, now abandoned. Included in the objects of my invention are:

First, to provide an applicator for drill pipe protector rings which involves a mechanism having radially expansible fingers adapted to be inserted in a drill pipe protector ring to stretch the protector ring, and a transfer sleeve adapted to receive the protector ring for later placement on a drill pipe.

Second, to provide an applicator of this type which permits thorough inspection of the drill pipe protector ring in its expanded condition so that incipient flaws may be detected before the protector ring is applied to the drill pipe, thereby to minimize later failure of the protector ring in service.

Third, to provide in an applicator for drill pipe protector ring a novelly arranged transfer sleeve adapted to slidably receive a drill pipe, and incorporating means whereby the protector ring may be pushed from the transfer sleeve onto the drill rod.

Fourth, to provide a transfer sleeve which may be serially connected with their protector rings thereon so that several protector rings may be applied to a drill pipe in one operation.

Fifth to provide an apparatus of this class wherein the need for lubrication of the protector ring is eliminated, so that once the protector ring is positioned, it grips firmly on the drill pipe, and wherein if desired the protector ring may be cemented to the drill pipe.

Sixth, to provide an apparatus of this class which is relatively lightweight and portable.

Seventh, to provide in conjunction with an apparatus of this class, a novelly arranged transfer sleeve which is relatively inexpensive so that a large number of such sleeves may be equipped with stretched protector rings, then delivered to the point of use, whereupon the protector rings may be transferred to the drill pipe.

With the above and other objects in view as may appear hereinafter, reference is directed to the accompanying drawings, in which:

Figure 1 is a longitudinal sectional view of one form of my apparatus with the spreader fingers shown fragmentarily, the apparatus being shown by solid lines in its collapsed position and by dotted lines in its expanded position;

Fig. 2 is a transverse sectional view through 2—2 of Fig. 1;

Fig. 3 is a transverse sectional view through 3—3 of Fig. 1;

Fig. 4 is a transverse sectional view through 4—4 of Fig. 1, showing the spreader fingers by solid lines in their radially extended position and with a protector ring stretched thereon, and showing a transfer sleeve positioned to receive the protector ring;

Fig. 5 is an elevational view of the transfer sleeve with the protector ring omitted;

Fig. 6 is a partial sectional, partial elevational view of the transfer sleeve, taken through 6—6 of Fig. 5, and showing a drill pipe protector ring thereon in section;

Fig. 7 is a partial sectional, partial elevational view of a modified form of protector ring expander, taken through 7—7 of Fig. 8, showing the expander by solid lines in its retracted position and by broken lines in its partially extended condition;

Fig. 8 is an end view thereof, in its contracted position;

Fig. 9 is a fragmentary view, showing a modified form of expander finger and supporting frame;

Fig. 10 is a partial sectional partial elevational view of a modified form of transfer sleeve for use with the expander shown in Fig. 9;

Fig. 11 is a sectional view taken along the plane 11—11 of Fig. 9, showing the expander in its retracted position;

Fig. 12 is a similar fragmentary sectional view, showing the expander in its expanded position with the protector ring stretched to permit insertion of the transfer sleeve;

Fig. 13 is a similar fragmentary sectional view, showing the protector ring released from the expander and supported by the transfer sleeve;

Fig. 14 is a partial sectional, partial end view of a further modified form of expander;

Fig. 15 is a fragmentary sectional view thereof, through 15—15 of Fig. 14;

Fig. 16 is a fragmentary view, showing a further modified form of expander finger; and Fig. 17 is a partial sectional, partial side view, showing the stripping mechanism for the modified transfer sleeve, and indicating the manner in which several such transfer sleeves may be connected in series.

Reference is first directed to the construction shown in Figs. 1 to 4, showing one form of protector ring expander. A hydraulic cylinder 1 is provided, to one end of which is secured a clamping collar 2 which supports a ring 3, having a series of outwardly directed, equally spaced clevis members 4; a spreader arm 5 is pivotally connected to each clevis member. The several spreader arms extend axially and converge. The extremity of each spreader arm is shaped to form a finger 6. The radially inner sides of the fingers are shaped so that the several fingers nestle together and compositely form an initially tapering mandrel, adapted to receive a protector ring R.

The hydraulic cylinder 1 is equipped with a piston, not shown, but which operates a stem 7, protruding from the cylinder between the spreader arms 5. The extremity of stem 7 carries a spreader ram 8, having a ring of rollers 9 adapted to engage the radially inner sides of the spreader arms 5. Attached to the ram 8 are retainer yokes 10 which extend over the radially outer sides of the arms 5 as shown best in Fig. 3.

Upon operation of the hydraulic cylinder 1, the stem 7 thrusts the spreader ram 8 between the arms 5 so that the fingers 6 are moved from the solid line position to the dotted line position shown in Fig. 1.

Reference is now directed particularly to Figs. 4, 5, and 6, showing one form of transfer sleeve. A transfer sleeve 11 is provided which is in the form of a short hollow cylinder, open at its ends, and provided with axially directed slots 12 adapted to receive the fingers 60 as shown best in Fig. 4; that is, segmental tongues are formed between the slots 12 which are adapted to permit relative axial as well as radial movement of the fingers 6. The diameter of the transfer sleeve is such that when the fingers 6 are expanded to and stretched over a protector ring, the sleeve 11 fits freely within the protector ring. On subsequent collapse of the fingers 6, the protector ring is retained by the transfer sleeve and the fingers 6 may be withdrawn axially.

The transfer sleeve is adapted to receive an axially slidable collar 13 which may have rudimentary fingers 14 adapted to fit into the slots 12. When the collar 13 is forced axially, the protector ring may be forced from the transfer sleeve 11. The collar 13 is provided with a radial flange 15 which is adapted to be engaged by stems 16 protruding from hydraulic cylinders 17. The cylinders 17 are secured to a collar 18 which in turn is removably secured to the transfer sleeve 11 by means of bolts or other devices. The fingers 14 may be omitted so that the collar 13 may be removed with the collar 18.

After the protector ring R has been placed on the transfer sleeve 11, the transfer sleeve is slipped over the end of a drill pipe, whereupon the cylinders 17 are actuated to force the protector ring from the sleeve onto the drill pipe. It should be observed that one collar 18 with its cylinders 17 may be used in succession on any number of transfer sleeves. Thus, it is possible to load a large number of relatively inexpensive transfer sleeves with protector rings. This operation may be done at a central plant and the rings transported to the point of use.

Reference is directed to Figs. 7 and 8. In the construction here illustrated the expander fingers are moved in parallel planes, rather than pivoted as in the first described structure. As in the first described structure, six expander fingers 21 are shown which are capable of nesting together in parallel relation, as shown in Fig. 8.

Each expander finger 21 is attached to an arm 22 disposed outwardly and rearwardly of the expander finger and attached by a pair of parallel links 23 to a ram head 24. The ram head is mounted on the end of a stem 25 connected to a piston, not shown, within a cylinder 26. Several of the arms 22, preferably three of the arms, are connected to tension rods 27, which are pivotally supported by brackets 28 secured to a collar 29 mounted on the cylinder 26.

Operation of the expander illustrated in Figs. 7 and 8 is as follows:

Forward movement, that is, movement to the right, as viewed in Fig. 7, of the ram head 24 causes each of the arms 22 and their expander fingers 21 to move radially outward. A protector ring placed around the fingers 21 is thus expanded sufficiently to permit insertion of a transfer sleeve 11, as in the first described structure.

Reference is now directed to Figs. 9 to 13, inclusive. In this construction, arms 31 are substituted for the arms 22. Each arm 31 is provided with a radially inwardly extending fixed link 32. At its extremity it is provided with a pin 33 which receives a movable link 34 having a hook end 35 and a handle 36. The radially inward ends of the fixed link 32 and removable links 34 are provided with aligned bearings 37 which receive the ends of a finger bar 38. In this case, the finger bars 38 may be circular rods. It is intended that the expander, as shown in Fig. 9, be employed in conjunction with a transfer sleeve 41, as shown in Fig. 10.

The transfer sleeve 41 comprises an open ended cylinder having slots 42 closed at both ends to form webs 43 therebetween. One end of the transfer sleeve 41 is externally reduced to form a spigot end 44, whereas the other end is internally enlarged to form a bell end 45, so that several of the transfer sleeves 41 may be disposed in series. The spigot and bell ends 44 and 45 are provided with bayonet pins 46 and slots 47 so that the several transfer sleeves may be secured in series relation, as will be brought out in more detail hereinafter.

Operation of the expander shown in Fig. 9 and transfer sleeve shown in Fig. 10 is as follows:

The protector ring R is slipped over the finger bars 38, as shown in Fig. 11, and the removable links 34 are then secured in place. The expander is then operated to stretch the protector ring sufficiently to permit insertion of the transfer sleeve between the finger bars 38, as shown in Fig. 12. The expander is then contracted slightly to permit the finger bars 38 to enter the slots 42 so that the finger bars occupy the dotted line position shown in Fig. 13. Thereupon the removable links 34 are unhooked and the finger bars removed. The expander is then expanded to clear the transfer sleeve and protector ring supported thereon.

Reference is now directed to Figs. 14 and 15 which illustrate a further modified form of expander. In this construction a ring 51 is provided on which are mounted radiating cylinders 52. In the construction illustrated six such cylinders are provided. The cylinders 52 are suitably connected by a manifold tube 53 connected to a source of fluid pressure so that they may be operated simultaneously. Each cylinder 52 is provided with a radially inwardly directed stem 54 which is connected to a beam 55.

The extremities of the beams 55 carry a pair of pivotable straps 56, apertured at their radially inner ends to receive a finger bar 57. In this construction, one end of the finger bar 57 is reduced in diameter and the aperture in the corresponding strap is reduced so as to facilitate positioning of the finger bar. The aperture in the other strap is sufficiently large to slidably receive the finger bar 57 so that the finger bar may be removed axially. For this purpose one end of the finger bar may be provided with an extractor notch 58. In order to minimize the contracted position of the finger bars 57 their sides may be flattened.

Operation of the expander shown in Figs. 14 and 15 is essentially the same as the expander shown in Fig. 9, the transfer sleeve 41 being employed in conjunction therewith.

Reference is now directed to Fig. 16. In place of the beams 55 the stems 54 may be provided with hook structures 59 having fingers 60 to receive the expander ring. In this case the transfer sleeve 11 is employed.

Reference is now directed to Fig. 17, wherein several transfer sleeves 41 are shown connected in series. The bayonet connected means at an end of one of the transfer sleeves is connected to a mating attachment ring 61 having a flange 62 which supports two or more cylinders 63. A stem 64 protrudes from each cylinder 63 and is equipped with an end fitting 65 to which is pivotally connected a stripping lever 66. The radial distance between the stems 64 is such that they may pass over the protector rings, as indicated by dotted lines.

The stripping levers 66 are so pivoted relative to the end fittings 65 that they bear against the end fittings when the stems 64 are thrust outwardly from their cylinders so as to engage and strip the protector rings from the transfer sleeves. With this arrangement it is possible to remove the protector rings individually from their transfer sleeves. However, it is possible to push on the protector ring adjacent the attachment ring 61 and cause this ring to push on the next one so as to strip the furthest ring from the series of transfer sleeves.

It will be observed that the construction shown in Fig. 6 and the construction shown in Fig. 17 may be readily slipped over a drill pipe, that is, the transfer sleeves 11 or 41 are of sufficient internal diameter to slidably receive the corresponding size of drill pipe. In the case of transfer sleeve 41, its outside diameter and wall thickness may be somewhat less than the diameter of the transfer sleeve 11 due to the fact that its slots 42 are closed at both ends.

In practice, the protector rings are frequently installed as the drill pipe is being run into a well. Prior to making up a stand of drill pipe the transfer sleeve and stripping device are slipped over the drill pipe and moved to the desired location, whereupon the protector ring is stripped from the transfer sleeve and deposited onto the drill pipe. The transfer sleeve is then removed and the stand of drill pipe made up on the previously formed string suspended in the well. This operation is repeated as the drill pipe string is run into the well. It is frequently desirable to place two or three protector rings on a stand of drill pipe. This may be accomplished by the arrangement shown in Fig. 17.

It is sometimes desirable to cement the protector ring on the drill pipe and it is preferable, in such instances, that the protector ring be deposited on the drill pipe without appreciable relative axial movement. This is readily accomplished by use of my transfer sleeves 11 or 41. The desired section of the drill pipe is coated with an adhesive, the transfer sleeve is moved thereover, and the protector ring is stripped from the transfer sleeve as the sleeve is moved out from under the protector ring.

Having fully described my invention, it is to be understood that I do not wish to be limited to the details herein set forth, but my invention is of the full scope of the appended claims.

I claim:

1. An apparatus for applying protector rings to drill pipe, comprising: a plurality of fingers adapted to be inserted in an expansible drill pipe protector ring; means for expanding said fingers radially to stretch said protector ring and expose the interior thereof between said fingers for inspection; a transfer sleeve adapted to be inserted in said protector ring and having slots to receive said fingers whereby said fingers may be moved radially inward to apply said protector ring to said transfer sleeve, and subsequently removable from within said sleeve and protector ring to expose for inspection through said slots of the transfer sleeve the portions of said protector ring previously covered by said fingers; and means for stripping said protector ring axially from said transfer sleeve to a drill pipe.

2. An apparatus for applying protector rings to drill pipe as set forth in claim 1, wherein: said finger expanding means includes a piston and cylinder means, a thrust member operated by said piston; a frame secured to said cylinder means, a plurality of converging lever arms pivotally connected to said frame, extending over said thrust means and each terminating in one of said expander fingers, said lever arms adapted to be spread by said thrust means.

3. An apparatus for applying protector rings to drill pipe as set forth in claim 1, wherein: said finger expanding means includes a plurality of parallelogram frame structures, each carrying one of said fingers and disposed radially about a common center, and means for altering the configuration of said parallelogram frames to expand and contract said fingers.

4. An apparatus for applying protector rings to drill pipe as set forth in claim 1, wherein: said finger expanding means includes a frame structure, a plurality of radially disposed piston and cylinder units, each having a stem extending toward a common center, and means for attaching each of said fingers to a corresponding stem.

5. An apparatus for applying protector rings to drill pipe as set forth in claim 1, wherein: each of said finger expanding means includes a pair of radially extending links, each of said fingers is in the form of a rod removably connected to the radially inner ends of said links and each of the slots in said transfer sleeve are closed at both ends.

6. An apparatus for applying protector rings to drill pipe as set forth in claim 1, wherein: each of said finger expanding means includes a pair of radially extending links, each of said fingers is in the form of a rod removably connected to the radially inner ends of said links, each of the slots in said transfer sleeve are closed at both ends, and said transfer sleeve is provided with coupling means at its extremities whereby a plurality of said transfer sleeves may be serially connected.

7. An apparatus for applying protector rings to drill pipe as set forth in claim 1, wherein: each of said fingers is attached to said finger expanding means by one end only, whereby the other end of each finger is free; and the slots in said transfer sleeve intersect one end of said transfer sleeve forming between said slots a plurality of projections adapted to axially intermesh with said fingers.

8. An apparatus for applying protector rings to drill pipe, comprising: a plurality of radially expansible fingers adapted to nestle together thereby to fit within an unexpanded drill pipe protector ring; means for radially expanding said fingers and protector ring; a transfer sleeve adapted to be inserted into said expanded protector ring, said transfer sleeve having slots to accommodate said fingers thereby to permit partial constriction of said protector ring onto said transfer sleeve and withdrawal of said fingers; said transfer sleeve adapted to fit slidably over a drill pipe with said protector ring thereon; and means for stripping said protector ring from said transfer sleeve onto said drill pipe.

9. An apparatus as set forth in claim 8, wherein: the slots of said transfer sleeve are closed at both ends and said fingers are insertable radially therethrough, and are axially withdrawable from said expanding means.

10. An apparatus as set forth in claim 8, wherein: the slots of said transfer sleeve are open at one end to form a plurality of axial projections between said slots, and said fingers are radially and axially movable in said slots between said projections.

11. An apparatus as set forth in claim 8, wherein: the slots of said transfer sleeve are closed at both ends and said fingers are insertable radially therethrough and are axially withdrawable from said expanding means, and said transfer sleeve is provided with coupling means at its extremities whereby a plurality of said transfer sleeves may be serially connected.

12. An apparatus for inspecting drill pipe protector rings and preparing the same for application to a drill pipe, comprising: a plurality of radially expansible fingers adapted to be inserted into a drill pipe protector ring and radially expanded to stretch said protector ring and expose the interior surface thereof between said fingers while stretched; a transfer sleeve adapted to receive said protector ring, said sleeve having slots to accommodate said fingers; said fingers being removable from said sleeve and protector ring to expose for inspection through said slots the portions of said protector ring initially covered by said fingers.

13. An apparatus as set forth in claim 12, wherein: the slots of said transfer sleeve are closed at both ends and said fingers are insertable radially therethrough, and are axially withdrawable from said expanding means.

14. An apparatus as set forth in claim 12, wherein: the slots of said transfer sleeve are open at one end to form a plurality of axial projections between said slots, and said fingers are radially and axially movable in said slots between said projections.

15. An apparatus as set forth in claim 12, wherein: the slots of said transfer sleeve are closed at both ends and said fingers are insertable radially therethrough and are axially withdrawable from said expanding means, and said transfer sleeve is provided with coupling means at its extremities whereby a plurality of said transfer sleeves may be serially connected.

16. An apparatus for applying protector rings to drill pipe, comprising: a plurality of radially movable spreader fingers adapted for insertion in a drill pipe protector ring to radially expand said ring, the interior of said protector ring between said fingers being exposed for inspection when expanded; a transfer member having a plurality of prongs adapted to telescope between said spreader fingers and receive said protector ring thereby to expose the interior thereof initially concealed by said fingers; and means for transferring said protector ring from said transfer member to a drill pipe.

17. An apparatus for expanding and inspecting drill pipe protector rings, comprising: an annular supporting means; a plurality of arms, each pivotally connected to said means and converging axially toward each other; the extremities of said arms forming spreader fingers adapted to nestle complementally to receive a drill pipe protector ring; means for spreading said arms to expand said fingers radially and expose the interior of said protector ring between said spreader fingers to visual inspection; means having axially directed fixed fingers adapted to fit between said spreader fingers to receive said protector ring and support the same for visual inspection of the internal areas initially covered by said spreader fingers.

18. An apparatus for expanding and inspecting drill pipe protector rings, comprising: a plurality of radially movable spreader fingers adapted for insertion in a drill pipe protector ring to radially expand said ring, the interior of said protector ring between said fingers being exposed for inspection when expanded; and means having a plurality of prongs adapted to telescope between said spreader fingers and receive said protector ring thereby to expose the interior thereof initially concealed by said fingers.

19. An apparatus for expanding and inspecting drill pipe protector rings, comprising: a plurality of members adapted to be inserted in a drill pipe protector ring and moved radially to stretch said protector ring and expose the interior of said ring between said members for visual inspection; and a hollow annular structure defining a plurality of slots and axially directed support elements therebetween adapted to permit radial passage of said members thereby to transfer said protector ring to said hollow annular structure and expose the initially covered internal portions of said protector ring to visual inspection.

20. An apparatus for applying protector rings to drill pipe, comprising: a plurality of members adapted to be inserted in a drill pipe protector ring and moved radially to stretch said protector ring and expose the interior of said ring between said members for visual inspection; a hollow annular structure defining a plurality of slots and axially directed support elements therebetween adapted to permit radial passage of said members thereby to transfer said protector ring to said hollow annular structure and expose the initially covered internal portions of said protector ring to visual inspection; and means for transferring said protector ring from said hollow annular structure to a drill pipe.

21. An apparatus for transferring an expanded drill pipe protector ring from an expander having radially movable members adapted to stretch the protector ring to fit a drill pipe, said transferring apparatus comprising: a hollow annular structure defining a plurality of axially directed slots and ring supporting elements therebetween, said slots constructed and arranged to permit radial inward movement of said members therethrough whereby an expanded protector ring may be transferred from said expander members to said supporting elements; said annular structure constructed and arranged to fit slidably over a drill pipe; and means for urging said protector ring axially from said annular structure onto said drill pipe.

22. A method of inspecting drill pipe protector rings prior to applying said protector rings to drill pipe, characterized by: radially expanding the protector ring by axial engagement therewith at a plurality of points; inspecting said expanded protector ring between said points; supporting said protector ring while expanded by axial engagement between the first points of engagement; and completing inspection of said expanded protector ring in the regions of said first points.

23. A method of applying protector rings to drill pipe, characterized by: radially expanding a protector ring by axial engagement with the interior thereof at a plurality of first regions and applying radial force at said regions; partially retracting said protector ring for axial engagement at a plurality of second regions interposed between said first regions; fitting said partially expanded protector ring over a drill pipe; and urging said protector ring from said second regions onto said drill pipe.

References Cited in the file of this patent

UNITED STATES PATENTS

| | | |
|---|---|---|
| 1,669,053 | Hamel | May 8, 1928 |
| 2,291,976 | Minor | Aug. 4, 1942 |
| 2,328,771 | Barnes et al. | Sept. 7, 1943 |
| 2,334,558 | Jones | Nov. 16, 1943 |
| 2,346,301 | Harris | Apr. 11, 1944 |
| 2,435,868 | Boyd et al. | Feb. 10, 1948 |
| 2,522,495 | Ballagh | Sept. 19, 1950 |
| 2,674,034 | Stone | Apr. 6, 1954 |
| 2,687,566 | Hall | Aug. 31, 1954 |

FOREIGN PATENTS

| | | |
|---|---|---|
| 118,246 | Australia | Mar. 7, 1944 |